June 14, 1966   N. F. KELSEY   3,256,013
DISPLAY DEVICE WITH ONE RHEOSTAT
Filed April 5, 1963   2 Sheets-Sheet 1
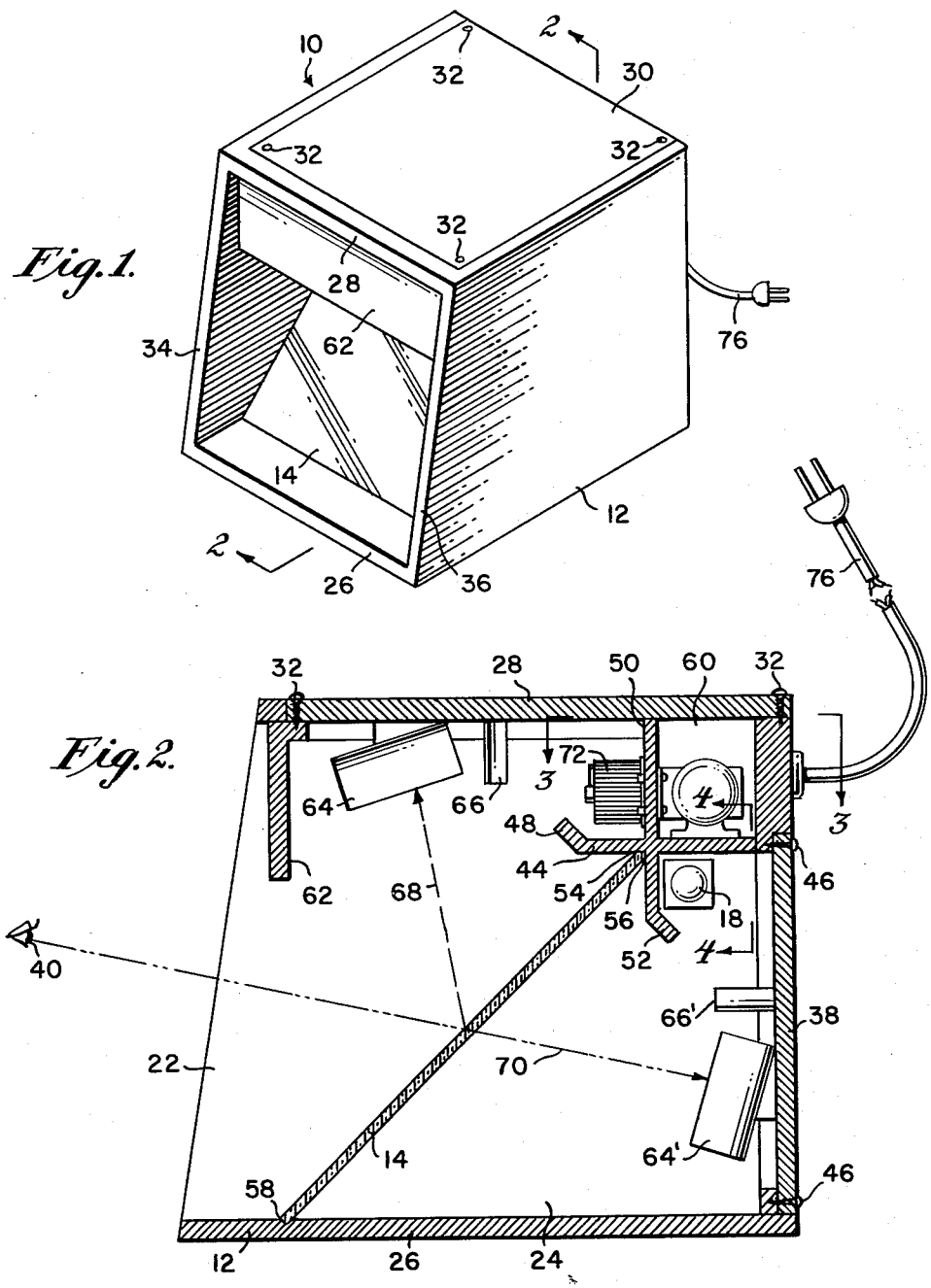
INVENTOR.
NORMAN F. KELSEY
BY
Caesar and Rivise
ATTORNEYS.

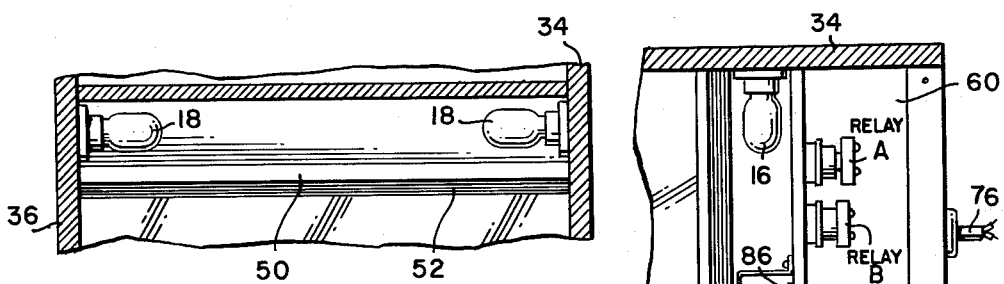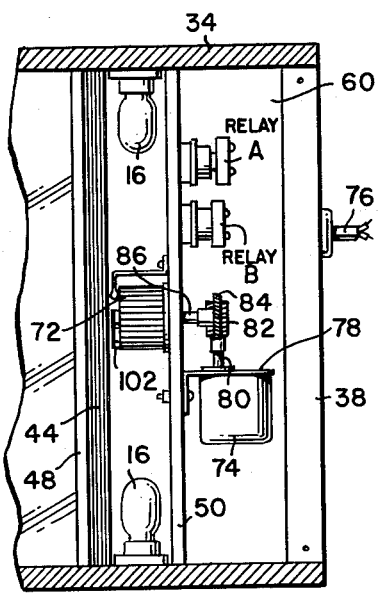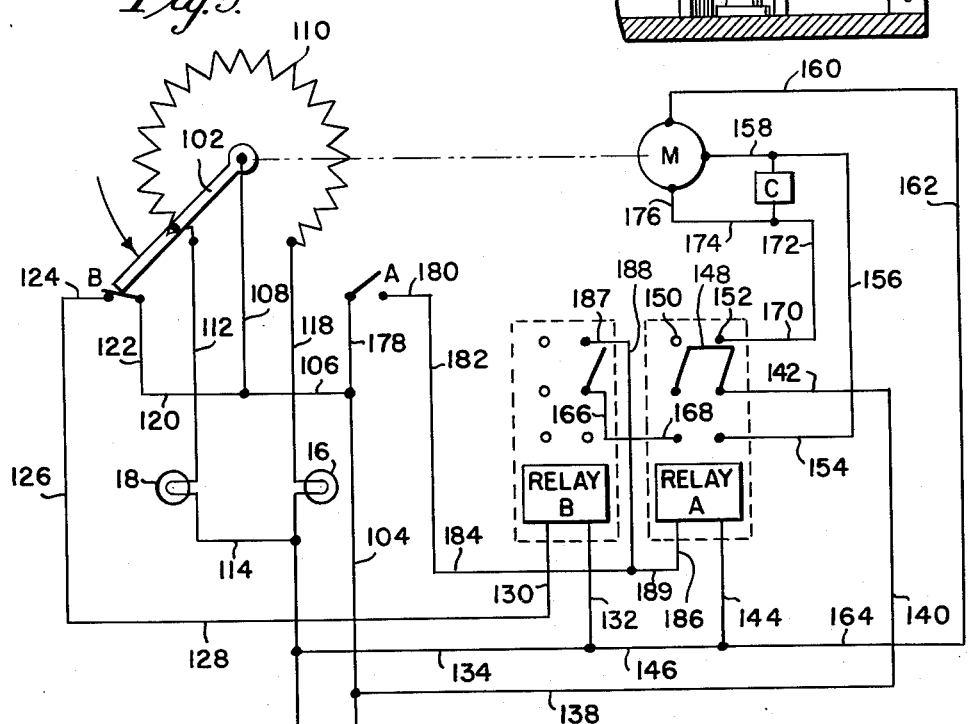

United States Patent Office 3,256,013
Patented June 14, 1966

3,256,013
DISPLAY DEVICE WITH ONE RHEOSTAT
Norman F. Kelsey, Philadelphia, Pa., assignor to Technical Displays Inc. (also known as Technical Displays, Inc., and Technical Displayers, Inc.), Philadelphia, Pa., a corporation of Pennsylvania
Filed Apr. 5, 1963, Ser. No. 270,905
5 Claims. (Cl. 272—8.5)

This invention relates to a novel display device with one rheostat and has as its objective the provision of a new and improved device of this general class.

Display devices are now widely used in presenting the features of a product. Toward this end it is most desirable that a display device attract the attention of viewers, and also demonstrate a product in a most flattering manner.

Accordingly, in the present invention there is provided a device whereby a product may be viewed in two positions or two features thereof may be specially displayed. The present invention also incorporates the attractive feature of having the view of one position fading away as the view of the second position becomes more and more prominent and is essentially superimposed upon the first view. For instance, where the packaging of an article is to be displayed, a view of the article in the package may be first presented. Then such a view is caused to fade away as the view of the contents of the package become more readily visible. This sequence is permitted to repeat itself so that the viewer will have an opportunity to orient himself to the two sequential presentations, and thereby create a lasting impression in his mind.

It is accordingly a principal object of the present invention to provide a novel display device with one rheostat whereby the views of two features of an article or an article in two different positions or conditions may be alternately shown to a viewer in a very interesting manner.

The foregoing as well as other objects of the present invention are achieved by providing a housing containing a "one-way" or transparent mirror which divides the housing into a front section and a rear section, with each of the sections being alternately and sequentially illuminated or darkened. When the front section of the housing is illuminated, a first object or a first condition or position of an object is viewable by reflection in connection with the mirror. When the rear section of the housing is illuminated, the second object or second condition or position of an article is viewable directly through the transparent mirror.

The effectiveness of the illusion created by the present invention is attributable to the sequential alternate brightening and dimming of the respective illuminating means. Thus, as the light glows dim in the front section of the housing, the light brightens in the rear section of the housing. In a similar manner when the light grows dim in the rear section of the housing, the light brightens in the front section of the housing thereby alternately making visible articles placed in the respective sections of the housing.

The foregoing sequential and alternate brightening and dimming of the respective illuminating means is achieved by means of a reversible motor alternately driving the resistance dividing arm of a rheostat in a first sense and then in a second sense. The reversing of the motor is initiated when the arm strikes one of two limit switches provided for this purpose. A pair of relays are also provided to transfer the reversing signal of the limit switches to the motor.

It is to be noted that the resistance dividing arm of the one rheostat of this invention functions to place a portion of the rheostat resistance in the circuit of one of the illuminating means and simultaneously to place the remainder of the rheostat resistance in the circuit of the other illuminating means. In this way the sequential alternate brightening and dimming of the respective illuminating means is carried out as the resistance dividing arm is driven by the motor from one limit switch to the other limit switch.

Other objects and many of the attendant advantages of this invention will be readily appreciated as the same becomes better understood by reference to the following detailed description when considered in connection with the accompanying drawings wherein:

FIG. 1 is a perspective view of the novel display device of the present invention taken generally from the front thereof;

FIG. 2 is an enlarged sectional view taken along the lines 2—2 of FIG. 1;

FIG. 3 is a sectional view taken generally along the lines 3—3 of FIG. 2;

FIG. 4 is a sectional view taken along the lines 4—4 of FIG. 2; and

FIG. 5 is a schematic view including appropriate circuitry showing the operation of the one rheostat assembly of the present invention.

Referring now in greater detail to the various figures of the drawing wherein similar reference characters refer to similar parts, a display device constituting an embodiment of the present invention is generally shown at 10 in FIG. 1 and basically comprises a housing 12 having a "one-way" or transparent mirror 14 positioned therein at a 45° angle. Also positioned in housing 12 (FIG. 2) are front illuminating means 16 (FIG. 3), rear illuminating means 18 (including suitable sockets and leads therefor) and a portion of the rheostat assembly for varying illuminating means 16 and 18 in a predetermined manner. The illuminating means may comprise two bulbs as shown in FIGS. 3 and 4, or more or less as desired.

As best shown in FIG. 2, the mirror 14 effectively divides the housing 12 into a front section 22 and rear section 24.

Turning now to the details of the housing 12 it is to be noted that it is basically comprised of a floor 26, a roof 28 with removable panel 30 (FIG. 1) held in place by wood screws 32. The housing 12 further comprises side walls 34 and 36 and rear wall 38. The front portion of the housing is open for purposes of permitting the eye 40 of a viewer to study certain objects placed inside of the housing 12 which are alternately rendered visible in a manner to be discussed in detail hereinafter.

In order to furnish support for certain important elements of the invention there is provided inside of the housing 12 adjacent the upper rear edge thereof (formed by the meeting of roof 28 and rear wall 38) a horizontal shelf 44 which is secured to the rear wall 38 by means of wood screws 46. The front edge of the horizontal shelf 44 terminates in an angulated lip 48 to serve as a light baffle for illuminating means 16. In a similar manner a vertical panel 50 is secured to roof 28 and terminates in an angulated lip 52 which serves as a light baffle for illuminating means 18.

At the intersection of the horizontal shelf 44 and the vertical panel 50 (FIG. 2) there is a horizontal ledge 54 against which the upper edge 56 of mirror 14 rests. The lower edge 58 of the mirror rests upon the floor 26 and may be restrained in the position of FIG. 2 by stops or other well-known means (not shown) if so desired. As is further evident from FIG. 2, the shelf 44 and the vertical panel 50 in conjunction with a portion of roof 28 and the rear wall 38, define a storage area 60 for the retention of certain portions of the rheostat assembly including relay A and relay B for purposes to be hereinafter discussed.

A masking piece 62 is also provided adjacent the front of the assembly in order to conceal certain of the operative elements and mechanisms contained inside housing 12.

As further noted in FIG. 2, there are provided first objects 64 and 66 and second objects 64' and 66' which are to be made alternately visible as permitted by the co-action of illuminating means 16 and 18 and mirror 14.

In accordance with this invention front illuminating means 16 is brightest when rear illuminating means 18 is darkest. As front illuminating means 16 becomes less and less bright, the rear illuminating means 18 becomes more and more bright. This tendency continues for about 30 seconds or one minute and includes a period in which rear illuminating means 18 is very bright and front illuminating means 16 begins to brighten as the rear illuminating means 18 begins to darken. In this connection it is to be noted that the front and rear illuminating means may be collectively referred to as light control means.

It is to be noted from FIG. 2 that when front illuminating means 16 is very bright and therefore rear illuminating means 18 is dark, essentially only the front section 22 of the housing 12 will be illuminated. In this situation the first objects 64 and 66 are viewed by reflection in accordance with the dash line 68 of FIG. 2.

However, when the rear illuminating means 18 becomes very bright with front illuminating means 16 now darkened, essentially only the rear section 24 of housing 12 will be illuminated. In this situation, the second objects 64' and 66' are viewed directly through the mirror 14 along the dash line 70 of FIG. 2. Moreover, the first objects 64 and 66 and the second objects 64' and 66' can be so positioned in the housing 12 that the reflected image of the objects 64 and 66 will appear precisely in the place of the direct view of the objects 64' and 66'.

The fading and reappearance of the first and second objects is brought about by a gradual dimming of one of the illuminating means with the simultaneous brightening of the other illuminating means. This occurs by virtue of the circuit arrangement as illustrated in FIG. 5 of the drawing wherein the circuit of front illuminating means 16 is shown to include a portion of a length the resistance winding of rheostat 72 dependent upon the precise position of dividing arm 102 which contacts the resistance and which is driven alternately to a first end of the resistance and then to a second end of the resistance. In a similar manner, the circuit of the rear illuminating means 18 is shown to include the remainder of the resistance winding of rheostat 72.

In this connection it is to be noted that when arm 102 is in the position of FIG. 5, there is very little resistance in the circuit of illuminating means 18, and essentially a maximum amount of resistance in the circuit of illuminating means 16. Hence, illuminating means 18 burns brightly whereas illuminating means 16 is very dark.

As illustrated in FIG. 3, a reversible motor 74, secured to vertical panel 50 by means of angle bracket 78, is employed to drive the arm 102 in accordance with the circuitry of FIG. 5. The motor 74 is a reversible, three wire synchronous type with capacitor, and imparts rotation to a shaft 80 having a worm gear 82 secured at the free end thereof. The rotation of worm gear 82 is in turn imparted to a meshing gear 84 having a shaft 86 secured for rotation therewith. Inasmuch as the arm 102 is actuated by the shaft 86, it follows that the rotation of motor 74 causes arm 102 to rotate in a given direction. The remainder of the circuitry of FIG. 5, including the limit switches A and B and the relay A and the relay B is employed to periodically reverse the rotation of the arm 102 upon the striking of the limit switches A or B. The relays A and B are essentially double throw switches, the relay A being of the double pole type and relay B being of the single pole type. Both of these are manufactured by the Guardian Electric Co.

Referring now to the circuitry of FIG. 5, power is provided through cable 76, and motor 74 is shown driving arm 102 in a counterclockwise direction. As viewed in FIG. 5, the limit switch B is eventually struck by the moving arm 102, as indicated in FIG. 5. With arm 102 in this position or in any other position, two circuits are closed.

First, there is a circuit which involves conductor 104, conductor 106, conductor 108 leading through arm 102 to the resistance coil 110 of the rheostat. At this point the circuit divides into a short path through conductor 112 and the bottom bank of lights and then through conductor 114 and finally to conductor 116 leading to the power source. The second current path is through the remainder of the resistance 110 and then through conductor 118 and top bank of lights and finally into conductor 116. It is, of course, understood that the current will divide into two separate paths, each of which involves a portion of resistance winding 110 in accordance with the precise position of the arm 102. The foregoing circuit is always in operation irrespective of the position of the arm 102.

With the arm 102 striking limit B in the position of FIG. 5, a circuit is also made back to the relay B by virtue of conductors 124, 126, 128 and 130. This circuit is completed back to the conductor 116 by means of conductors 132 and 134. When arm 102 strikes limit A, a circuit is made back to Relay A by virtue of conductors 180, 182, 184 and 189. This circuit is completed back to conductor 116 by means of conductors 144, 146 and 134.

It is to be noted that both relay A and relay B are of the double throw type with the relay A being of the double pole type whereas the relay B is of the single pole type. Each of the relays are normally open and are closed only by the introduction of power thereto in accordance with the various interconnections with the circuitry which has already been referred to and which will now be further described. As will be discussed, a portion of the connection between relay A and the power source is made through conductors 136, 138, 140 and 142.

As shown in FIG. 5, the normally off position of Relay A finds U-shaped conductor 148 thereof thrown upwardly so that power may pass from conductor 142 through conductor 148 and then to conductor 170 in order to drive the motor 74 in a first sense. When Relay A is energized, as when limit switch A is struck by arm 102, U-shaped conductor 148 is thrown downwardly so that power now passes from conductor 142 through conductor 148 and then to conductor 154 in order to drive the motor 74 in an opposite sense. With U-shaped conductor 148 is the downward closed position, a circuit is also made from conductor 142 through conductor 148 to conductor 168 and then to conductor 166. Relay B will be deenergized at this time, so the contacts thereof will be in the normally off position wherein the switch is closed so power may be passed from conductor 166 to conductor 187 and then to conductors 188, 189 and 186 to Relay A. Conductors 168, 166, 187, 188, 189 and 186 are deemed to constitute a by-pass circuit, holding Relay A on until the by-pass circuit is opened by energizing Relay B and opening the connection between conductors 166 and 187.

The contact bar 148 of relay A, by virtue of spring action, tends to contact points 150 and 152 thereby tending to hold the relay A in the normally open position. Relay B operates on a similar principle making contact between conductors 187 and 166 in the normally open position and breaking said contact in the normally closed position.

However, in the operation of relay A when limit switch A is struck by arm 102 by virtue of the circuit comprised of conductors 136, 104, 178, 180, 182, 184, 189, 186, 144, 146 and 134 back to 116, the contact bar 148 is brought to the normally closed position in contact with terminal 168.

In this way power may flow from the relay A through conductors 154, 156 and 158 to the motor 74 to drive it in a first direction thereby driving arm 102 in a counterclockwise direction toward limit switch B as viewed in FIG. 5. This motor circuit is completed by conductors 160, 162, and 164 back to conductor 116.

However when the limit B is struck by the arm 102 and the relay B closed by virtue of circuitry 124, 126, 128, 130, 132 and 134, the by-pass circuit is thereby broken since on closing of relay B there is no longer any contact between conductors 187 and 166, and the contact bar 148 returns under spring action in its normally open position to the contact points 150 and 152 thereby opening relay A. This return of bar 148 makes a circuit including conductors 136, 138, 140, 142 and conductors 170, 172, 174 and 176 to motor 74 so that it is now driven in a second sense. This in turn causes the arm 102 to be driven in a clockwise direction toward limit switch A as viewed in FIG. 5.

As soon as the arm 102 leaves the limit B thereby opening the switch B, the relay B is automatically open and the net result is that as the arm 102 is being driven in a clockwise direction, both relays are open.

When the arm 102 strikes the limit A, a circuit is made which includes conductors 104, 178, 180, 182, 184, 189 and 186 to the relay A, and further including conductors 144, 146 and 134 back to conductor 116. Thus the striking of the limit switch A causes relay A to be turned on. This in turn causes the conductor bar 148 to be moved to the downward position and thereby places power in the circuit made by conductors 154, 156 and 158 to the motor 74 thereby reversing the same, and in turn driving the arm 102 back in a counterclockwise direction. As soon as the arm 102 leaves the limit switch A, it would seem that the relay A would be open. However, the bypass circuit (148, 168, 166, 187, 188, 189, 186, 144, 146 and 134) existing when relay B is open causes relay A to remain closed thereby permitting power to be continued to be fed through conductors 154, 156 and 158 to motor 74 and maintain the driving of the arm 102 in a counterclockwise direction until limit switch B is hit to initiate the cycle.

When the limit switch B is hit, the resistance in the circuit including the bottom bank of lights is the least and hence these lights burn brightly. At the same time the resistance in the circuit involving the top bank of lights is at a maximum and for this reason the top bank of lights is essentially dark. When the limit switch A is struck, the reverse situation exists, namely, the top bank of lights is brightest and the bottom bank of lights is darkest. As the arm 102 proceeds from limit switch B to limit switch A, the bottom bank of lights darkens and the top bank of lights grows brighter. As the arm 102 proceeds from limit switch A to limit switch B, the top bank of lights darkens and the bottom bank of lights brightens.

In operation the cable 76 enables power to be fed to the motor 74 and also to illuminating means 16 and 18. The rotation of the reversible motor 74 drives arm 102 first in one sense and then in the other sense in accordance with the limit switches, relays and circuitry of FIG. 5 which function to reverse motor 74 whenever a limit switch is struck.

As the motor 74 drives arm 102 from limit B to limit A, it will be seen that both Relay A and Relay B are deenergized. Therefore both Relay A and Relay B will be in the normally off condition. Thus, U-shaped conductor 148 of Relay A is thrown upwardly in the normally off position so that power passes from conductor 142 to conductor 170 to drive the motor 74 in a first sense. In this manner, the arm 102 is driven in a clockwise sense toward limit A as shown in FIG. 5.

When arm 102 strikes limit A, a circuit is completed to Relay A, and Relay A is energized. Therefore, U-shaped conductor 148 of Relay A is now thrown downwardly and power passes from conductor 142 to conductor 154 to drive motor 74 in an opposite sense. Hence, arm 102 is now driven by the motor 74 in a counterclockwise sense toward limit B. When the arm 102 no longer contacts limit A, it would seen that the Relay A would be deenergized. However, Relay A remains energized because of the operation of the by-pass circuit so long as Relay B is deenergized. Of course Relay B will remain deenergized until arm 102 strikes limit B. With Relay B deenergized, the contacts thereof will remain in the normally off position wherein the switch is closed so that power may be passed from conductor 166 to conductor 187. The by-pass circuit is therefore closed and Relay A remains energized by power flowing from conductor 142 through conductors 168, 166, 187, 188, 189 and 186.

When the limit switch B is struck, the Relay B is energized and the by-pass circuit is now open because the contacts of Relay B are no longer in the normally off condition. At this point, the conductor 148 of relay A returns to the normally off condition, and power now is sent to conductor 170 to reverse the operation of motor 74 and drive arm 102 in a clockwise sense back toward limit A.

Because of the movement of arm 102 in dividing all of the resistance of rheostat 72 between the circuits of the two illuminating means, an increase in the resistance placed in one of the circuits is accompanied by a simultaneous decrease in the resistance in the other circuit.

The movement of arm 102 is controlled by the operation of motor 74 through Relay A and B with motor 74 driving arm 102 from limit B to limit A and back.

Therefore, one illuminating means is caused to brighten while the other illuminating means is caused to darken. Hence, one section of the housing 12 is rendered increasingly brighter while the other section of the housing 12 is rendered increasingly darker. Then the cycle reverses with the dark section becoming brighter and the light section simultaneously becoming darker. When the front section 22 of housing 12 is brightened by illuminating means 16, first objects 64 and 66 may be viewed by reflection against the "one-way" mirror 14. At this time rear section 24 is quite dark. As the front section 22 becomes darker (by virtue of increased resistance placed in the circuit of illuminating means 16 by the movement of the arm 102 of rheostat 72 in a counterclockwise direction as viewed in FIG. 5) the illuminating means 18 is simultaneously growing brighter. This is because the power travels from the arm 102 only through a short section of resistance of rheostat 72. When the rear illuminating means 18 is very bright, the front illuminating means 16 will be quite dark. Thus the rear section 24 of the housing 12 will be bright and the front section 22 of the housing 12 will be quite dark. In this condition the bright material behind the mirror 14 may be directly viewed as the mirror 14 no longer reflects, but rather permits light to pass through it.

It is thus seen that the cycle of brightening and darkening will continue many times and thereby permit the viewer to note the details of two positons of a particular article or two features thereof in a most striking manner. Also, the apparatus of the present invention is reliable and susceptible to easy maintenance.

Furthermore, by precise positioning of the respective articles in the front and rear sections of the housing, the image of one article will be precisely superimposed on the view of the other article, thereby enhancing the fading effect. It is further seen that when illuminating means 16 and 18 are of equal brightness the superimposed image and view will be of equal intensity, and that thereafter, one will disappear gradually as the other becomes more evident.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A novel display device comprising a housing containing a light transmitting mirror dividing the housing into a front section and a rear section, front illuminating means adapted to illuminate said front section and rear illuminating means adapted to illuminate said rear section, and light control means to sequentially and alternately brighten one of said illuminating means while simultaneously darkening the other of said illuminating means, said light control means comprising a rheostat including a length of resistance extending from a first end to a second end, a resistance dividing arm in contact with said length of resistance, said arm being alternately driven by reversible motor means between said first and second ends, first and second limit switch means adjacent each of said ends and being adapted to be closed by said resistance dividing arm upon reaching one of said ends, and circuitry including first and second normally open relays associated with said two illuminating means, arm, motor means and switches, said first relay being closed when said first switch is closed and said second relay being closed when said second switch is closed whereby said arm will be driven in a first sense until one of said switches is closed by said arm so that said arm is thereafter driven in a second sense until another of said switches is closed by said arm, the resistance in the respective circuits of said two illuminating means being gradually varied and essentially determined by the position of said arm whereby a cycle is provided wherein at a first point one of said illuminating means brightens as the other of said illuminating means becomes darker, until a second point is attained, at which point a reversal is initiated so that the darkened illuminating means will start to become brighter as the brightened illuminating means will start to become darker until said first point in the cycle is attained.

2. The invention of claim 1 including a first object placed in the front section of said housing and a second object placed in the rear section of said housing, said first object being viewable as an image by reflection when the front section of said housing is illuminated and said second object being directly viewable as a direct view through said mirror when the rear section of said housing is illuminated, said objects being so positioned with respect to each other, that said image and said direct view will essentially coincide whereby the sequential, alternate brightening and dimming of said illuminating means causes said image and direct view to appear and fade in a sequential and alternate manner.

3. The invention of claim 2 wherein the first of said relays is essentially a double pole, double throw switch, and the second of said relays is essentially a single pole, double throw switch.

4. The invention of claim 3 wherein closing of said first relay when said second relay is open closes a bypass circuit through said second relay to hold said first relay closed after said arm no longer contacts said first switch.

5. A novel display device comprising a housing containing a light transmitting mirror dividing the housing into a front section and a rear section, front illuminating means adapted to illuminate said front section and rear illuminating means adapted to illuminate said rear section, and light control means to sequentially and alternately brighten one of said illuminating means while simultaneously darkening the other of said illuminating means, said light control means comprising a rheostat including a length of resistance extending from a first end to a second end, a resistance dividing arm in contact with said length of resistance, said arm being alternately driven between said first and second ends by reversible motor means, means to sequentially reverse the direction of movement of said motor means when said arm reaches one of said ends, the resistance in the respective circuits of said two illuminating means being gradually varied and essentially determined by the position of said arm whereby a cycle is provided wherein at a first point one of said illuminating means brightens as the other of said illuminating means becomes darker, until a second point is attained, at which point a reversal is initiated so that the darkened illuminating means will start to become brighter as the brightened illuminating means will start to become darker until said first point in the cycle is attained.

References Cited by the Examiner

FOREIGN PATENTS 933,834   1/1948   France.

RICHARD C. PINKHAM, *Primary Examiner.*

FREDERIC B. LEONARD, *Assistant Examiner.*